Figure 2:
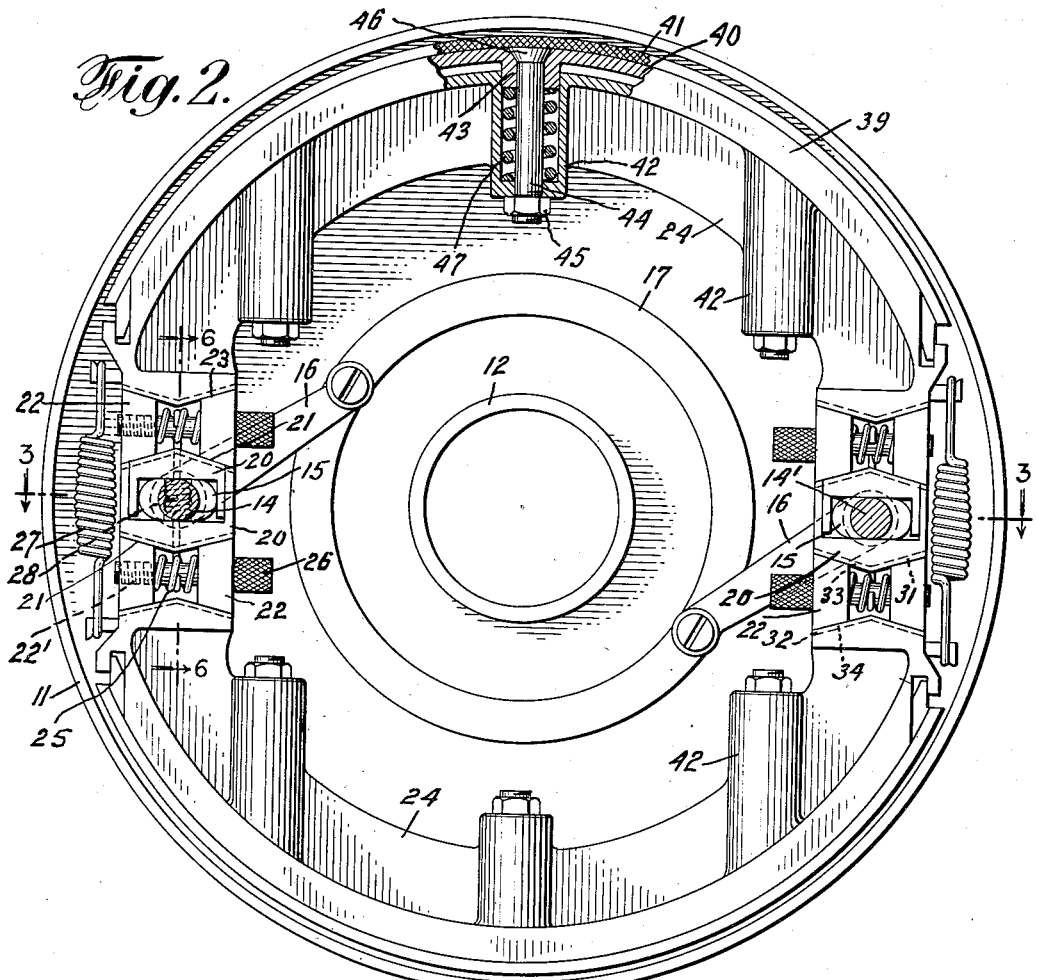

Jan. 2, 1934.  J. A. ALBERT  1,941,965
BRAKE
Filed Aug. 13, 1930  2 Sheets-Sheet 1
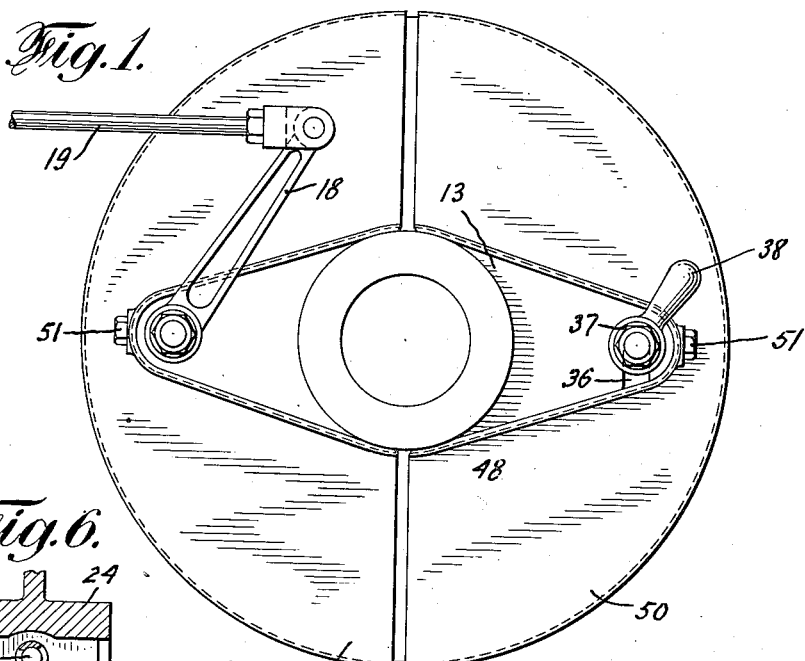
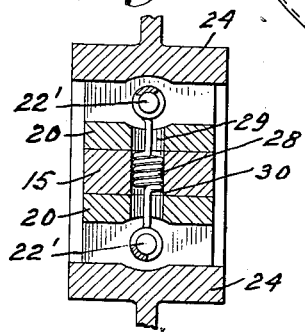
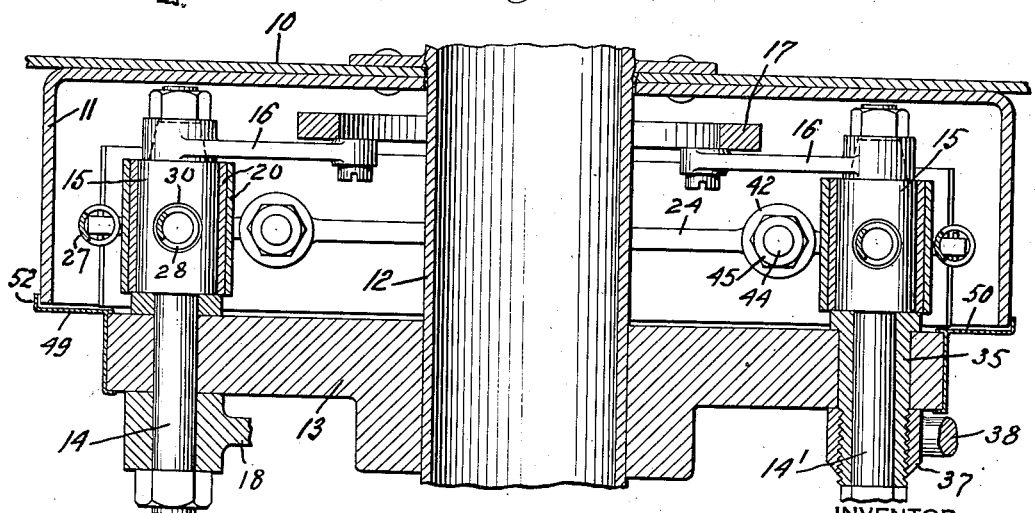
INVENTOR
J. A. Albert
BY
ATTORNEY Jan. 2, 1934.  J. A. ALBERT  1,941,965
BRAKE
Filed Aug. 13, 1930  2 Sheets-Sheet 2

INVENTOR
J. A. Albert
BY
Sigmund Herzog
ATTORNEY

Patented Jan. 2, 1934

1,941,965

UNITED STATES PATENT OFFICE 1,941,965

BRAKE

Joseph A. Albert, New York, N. Y., assignor to Aldo M. Franchi, New York, N. Y.

Application August 13, 1930. Serial No. 474,986

15 Claims. (Cl. 188—78)

The present invention relates to improvements in brakes, and more particularly to motor vehicle brakes, although not limited to that use. The invention pertains more specifically to that type of brakes wherein a brake-drum is attached to the vehicle wheel and brake-shoes are mounted within the drum for co-operation with the inner surface of the latter.

In the ordinary construction of motor vehicle brakes, the shoe or shoes are provided with friction coverings or facings of more or less resilient material. These coverings must, from time to time, be renewed for obvious reasons. When the shoes are to be re-faced they have to be removed from the brake-drum, and, in order to do this, it is necessary to dismount the wheel from the motor vehicle.

One of the main objects of the invention is to provide a brake construction wherein the brake-shoes are adapted to be removed from and mounted within the drum without removing the wheel from the vehicle.

Another object of the invention is to so construct the friction coverings of the shoes that they may be applied to the said shoes without the aid of special tools and by unskilled labor.

A further object of the invention is to provide a composite brake-shoe, one element of which consists of a body of cast metal and another element of which is removably mounted on the said body and carries a friction facing, the object being to so design the construction that the facing carrying element and the facing thereon may be sold as a unit and be kept in stock by motor vehicle accessory dealers for replacement.

A still further object of the invention is to resiliently mount the facing carrying element on the brake-shoe for the purpose of gradually applying the brake-shoes to the brake-drum.

A still further object of the invention is to provide a brake of the character described in which two independent brake-shoes are provided, in combination with actuating means for causing equal expanding movement of both shoes under all circumstances.

Another object of the invention is to provide a brake of the character described which is simple in construction, efficient in operation, durable in use and capable of manufacture on a commercial scale, or in other words one which is not so difficult to make as to be beyond the reasonable cost of such a contrivance.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

Two of the many possible embodiments of the invention are illustrated in the accompanying drawings, in which:—

Figure 4:
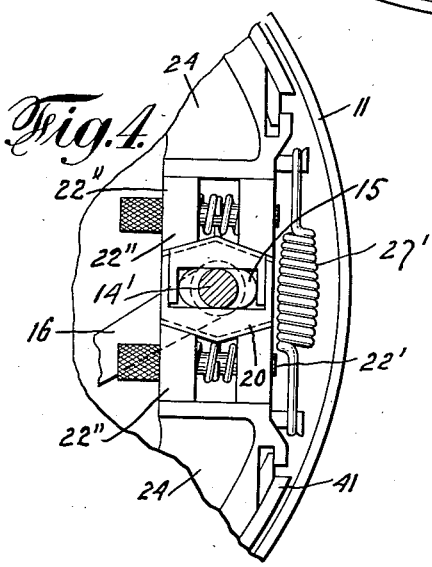
Figure 5:
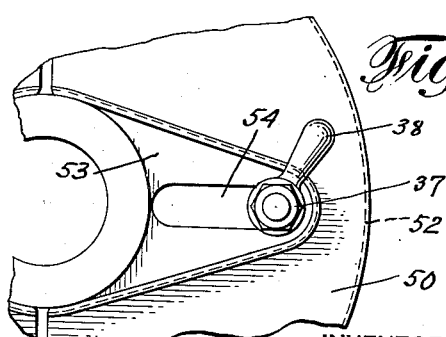

Figure 1 is a front elevation of a brake constructed in accordance with the present invention; Fig. 2 is a similar elevation, partly in section, on a larger scale, with the cover elements removed so as to show the interior construction; Fig. 3 is a section taken on line 3—3 of Fig. 2, showing however the said cover elements; Fig. 4 is a fragmentary front elevation of a modification of the invention, the cover being removed; Fig. 5 is a siimlar elevation of the device shown in Fig. 4 with the cover thereon; and Fig. 6 is a section taken on line 6—6 of Fig. 2.

Referring now first to Figs. 1 to 3, inclusive, and Fig. 6 of the drawings, the numeral 10 designates a portion of a motor vehicle wheel, to which is secured in any suitable manner a brake-drum 11. Through this drum extends centrally an axle 12, on which the wheel is mounted. This axle carries outside of the drum a stationary brake-assembly carrier 13. At equal distances from the longitudinal axis of the axle 12 and at diametrically opposite points of the latter extend oscillatably through the carrier 13 two spindles 14 and 14', which are each provided within the drum with a cam 15. The spindles are connected by links 16 to a ring 17, disposed within the drum in concentric relation to the axle 12, the purpose of the construction being to cause the cams to turn in opposite directions, when one of the said spindles is turned on the carrier 13. To the spindle 14 is fixed in any suitable manner a lever 18, to which is secured an actuating rod 19, which may be connected to a hand- or foot-lever, as usual in constructions of this type.

With each cam co-operate two cam saddles 20 which are slidably mounted in relation to one another. The outer faces of these saddles taper in opposite directions, as indicated at 21, and with each of the tapers co-operates an adjusting block 22, two adjusting blocks being associated with each cam saddle member. The adjusting blocks are also tapered, they being substantially wedge-shaped, one of the tapered faces of each adjusting block co-operating with the correspondingly shaped face of a saddle block, and its other face co-operating with the tapered face 23 of a brake-shoe 24.

There are two brake-shoes provided, one above the brake assembly carrier 13 and one below the same, said shoes being of equal size and design.

Each set of adjusting blocks 22 is connected by a screw-bolt 22', the members of each set of adjusting blocks being spaced, as shown in the drawings, and having interposed therebetween a spring 25, which is coiled upon the screw-bolt. Each bolt 22' is provided with a milled head 26, to facilitate rotation of the same.

The two shoes are connected by springs 27, which have a tendency to seat the ends of the shoes on the adjusting blocks 22 and to keep the braking elements disengaged from the drum when the cams are in their central positions, shown in Fig. 2 of the drawings. By reason of the tapering faces of the brake-shoe ends, of the adjusting blocks 22, and of the cam saddles 20, the elements mentioned are prevented from moving in relation to one another at right angles to the longitudinal axis of the axle 12. The adjusting blocks 22 and the cam saddles 20 on either side of the axle 12 form a unit, the two sets of adjusting blocks 22 on either side of the said axle being connected by a spring 28, the ends of which are fixed to the respective bolts 22' and the spring extending through registering apertures 29 and 30 in the saddles 20 and the respective cam 15. In order to prevent the brake-shoes from moving in the direction of the longitudinal axis of the axle 12, the tapering faces of the cam saddles 20 and the tapering faces of the shoe-ends 24 are provided with grooves 31 and 32, respectively, into which are fitted projections 33 and 34, respectively, on the tapered faces of the adjusting blocks 22.

That end of the spindle 14' which extends through the brake-assembly carrier 13 is oscillatably mounted in a bushing 35. This bushing is adapted to be inserted into the brake-assembly carrier through a vertically extending slot 36 in the latter, it being kept in operative position by clamping nut 37, which is provided with an actuating lever 38.

Each of the brake-shoes 24 is provided with two flanges 39, projecting in parallel relation toward the inner face of the brake-drum. Between the flanges of each shoe is slidably mounted a brake-facing carrier 40, to which is fixed in any suitable manner a friction facing 41, for co-operating with the brake-drum Each brake-shoe has formed thereon a plurality of hollow bosses 42, through which are extended lugs 43 on the respective facing carrier 40, the connection between a brake-shoe and its facing carrier being made by screw-bolts 44 and nuts 45, the said screw-bolts being provided with heads 46, which are counter-sunk in the lugs 43, the nuts 45 bearing against the outer faces of the free ends of the bosses 42. Within each boss is disposed a spring coil 47, bearing against the respective lug 43 and having a tendency to space the shoe and the respective facing carrier 40, as clearly shown in Fig. 2 of the drawings.

To prevent dust and other foreign matter from entering the brake-drum, a cover 48, consisting of two sections 49 and 50 is attached to the brake-assembly carrier 13, for instance by screw-bolts 51, each section being provided with a peripheral flange 52, which fits loosely over the outer face of the brake-drum 11.

Referring now to the positions of the elements shown in the several figures of the drawings, it will be noted that the cams 15 are in their central positions, in which the friction-facings of the carriers 40 are disengaged from the inner face of the brake-drum, the said elements being kept in these positions by the springs 27. The nuts 45 on the bolts 44 limit the outward movement of the carriers 40 and their facings 41. Of course, the adjusting blocks are set, when the brake is being mounted upon the vehicle wheel, by means of the bolts 22' to prevent engagement of the facings with the drum when the cams are in their central positions. It being desired to apply the brake, the rod 19 is shifted in the proper direction, whereby the cams are turned simultaneously in opposite directions, thereby causing the cam saddles 20 to move in opposite directions, that is away from one another, thus shifting the brake-shoes toward the inner face of the brake-drum. As this last-mentioned movement takes place, first the springs 47 are somewhat compressed and thereby shift the carriers 40 and their facings 41 into engagement with the inner face of the brake-drum, the final application being made by the continued outward movement of the brake-shoes 24, which are thus tightly applied against the brake-drum to retard and stop the rotation of the latter.

It will be noted that, inasmuch as the brake-shoes are actuated by two interconnected cams which act upon the shoe-ends by the intermediary of the cam saddles 20 and adjusting blocks 22, the said shoes are caused to expand equally and to apply simultaneously the entire areas of the exposed faces of the friction facings to the inner surface of the brake-drum.

It will also be noted that, inasmuch as the brake-shoes are of composite nature, each comprising a body portion and a facing carrier which are readily detachable, the facing carriers with the facings applied thereto may be kept in stock, as a unit, by motor vehicle accessory dealers, and are adapted to be readily mounted on the brake-shoes. Now, for the purpose of mounting these elements on the brake-shoes, it is unnecessary to remove the wheel from the motor vehicle. The removal may be accomplished as follows: First, the cover sections 49 and 50 are removed from the brake-assembly carrier 13. After this, the bolts 22' are turned in a direction to cause the adjusting blocks to move away from one another, whereby the brake-shoes move toward each other. The springs 27 are then disengaged from the brake-shoes and one of the links 16 disconnected from the ring 17. The operator thereupon takes hold of the lower brake-shoe and the elements carried thereby and removes the same from the brake-drum. After this, the nut 37 on the bushing 35 is loosened, whereby the spindle 14', the cam saddles and adjustment blocks associated with the said spindle may be dropped down as a unit, the slot 36 in the brake-assembly carrier permitting this motion of the said elements. The said unit may be removed entirely from the structure, so that, in case an obstruction on the chassis prevents removal of the upper brake-shoe, the said shoe may be turned in the drum until it clears the obstruction so as to be removable from the drum. Thereafter the facing carriers and facings are dismounted from the shoes and replaced by new ones, the elements of the brake being assembled in the reverse order above described.

On some chassis structures it may be impossible to remove first the lower brake-shoe. In such case, instead of the brake-assembly carrier described in connection with Figs. 1 to 3, inclusive, of the drawings, a carrier may be used in which the slot 36 extends upwards instead of downwards, as shown in Fig. 1 of the drawings.

The modification illustrated in Figs. 4 and 5 differs from the one above described only in that the cams, cam saddle and adjustment block units are adapted to be shifted horizontally on the brake-assembly carrier 53. This carrier is provided with a horizontal slot 54, through which the bushing 35 is extended. In this instance, however, those faces of the adjusting blocks 22" which contact with the brake-shoe ends 24, are not tapered, as clearly shown in Fig. 4 of the drawings. Consequently, when the springs 27 are disengaged from the brake-shoes and the nut 37 is loosened on the bushing 35, the spindle 14', the cam saddles 20 and the adjusting blocks 22" are adapted to be shifted toward the vehicle axle 12 to clear the ends of the brake-shoes, so that either one of the same may be turned to clear obstructions on a vehicle chassis. Otherwise the construction and operation of the elements are the same as those described in connection with Figs. 1 to 3, inclusive, of the drawings.

What I claim is:—

1. A composite brake-shoe comprising a body provided with a plurality of hollow bosses, a facing carrier, a friction facing fixed to said carrier, lugs on said carrier slidably seated in said bosses, a bolt extending through each lug and the respective boss, a spring within each boss bearing against the respective lug for spacing the carrier from the shoe, and a stop on each bolt for limiting the distance between the body and the carrier.

2. A brake comprising a drum, a stationary carrier, two cams oscillatably mounted on said carrier at equal distances from the center of said drum, two shoes within said drum, means interposed between said cams and the ends of said shoes so as to support the latter concentrically with said drum, said shoes being movable toward and from the inner face of said drum and the means interposed between each cam and a set of shoe ends including elements adapted to move in opposite directions, and means interconnecting said cams so as to oscillate the same in opposite directions, said cams being constructed to cause each set of said interposed means to move at all times equidistantly toward the inner face of said drum whereby said shoes are maintained at all times in concentric relation to said drum.

3. A brake according to claim 2, comprising a facing carrier on each shoe, a friction facing fixed to each carrier, each facing carrier and its facing being detachably mounted upon the respective shoe.

4. A brake according to claim 2, comprising a facing carrier on each shoe, a friction facing fixed to each carrier, and a resilient connection between each facing carrier and its respective shoe.

5. A brake according to claim 2, comprising means for independently adjusting the relation of each end of each shoe to the inner face of said drum.

6. In a brake according to claim 2, one of said cams and the interposed means co-operating therewith being adapted to be removed as a unit from said stationary carrier to permit said shoes to be removed from said drum.

7. In a brake according to claim 2, one of said cams and the interposed means co-operating therewith being adapted to be shifted as a unit on said carrier to clear said shoes, whereby the latter are capable of being removed from said drum.

8. A brake comprising a drum, a stationary carrier, two cams oscillatably mounted on said carrier at equal distances from the center of said drum, two shoes within said drum, two cam saddles associated with each cam, blocks interposed between each saddle and one end of a brake-shoe, said cam saddles and blocks being constructed so as to support said shoes concentrically with said drum, said shoes being movable toward and from the inner face of said drum, the elements of each set of cam saddles being adapted to move in opposite directions, and means interconnecting said cams to oscillate the same in opposite directions, said cams being constructed to cause said saddles to move at all times equidistantly toward the inner face of said drum whereby said shoes are maintained at all times in concentric relation to said drum.

9. A brake according to claim 8, comprising a facing carrier on each shoe, and a friction facing fixed to each carrier, each facing carrier and its facing being detachably mounted upon the respective shoe.

10. A brake according to claim 8, comprising a facing carrier on each shoe, a friction facing fixed to each carrier, and a resilient connection between each facing carrier and its respective shoe.

11. A brake according to claim 8, comprising means for independently adjusting the relation of each end of each shoe to the inner face of said drum.

12. A brake according to claim 8, comprising means for adjusting the relation of the blocks co-operating with each saddle to permit each end of each shoe to be independently adjusted in relation to the inner face of said drum.

13. In a brake according to claim 8, one of said cams with the saddles and blocks co-operating therewith being adapted to be removed as a unit from said stationary carrier to permit said shoes to be removed from said drum.

14. In a brake according to claim 8, one of said cams with the saddles and blocks co-operating therewith being adapted to be shifted as a unit on said carrier to clear said shoes, whereby the latter are capable of being removed from said drum.

15. A brake according to claim 8, comprising co-acting means on said saddles, blocks and shoes for preventing movement of said elements in a direction parallel to the axis of said drum, said means being made integral with said elements.

JOSEPH A. ALBERT.